United States Patent [19]
Noonan

[11] Patent Number: 5,213,853
[45] Date of Patent: May 25, 1993

[54] PHOTOSENSITIVE CROSSLINKABLE POLYESTER ALIGNMENT LAYERS FOR LIQUID CRYSTAL DISPLAYS

[75] Inventor: John M. Noonan, Rochester, N.Y.

[73] Assignee: Eastman Kodak Company, Rochester, N.Y.

[21] Appl. No.: 799,472

[22] Filed: Nov. 26, 1991

[51] Int. Cl.⁵ ............................................. G02F 1/1337
[52] U.S. Cl. ............................................ 428/1; 359/75; 359/78
[58] Field of Search ........................ 428/1; 359/75, 78

[56] References Cited

U.S. PATENT DOCUMENTS

| | | | |
|---|---|---|---|
| 3,929,489 | 12/1975 | Arcesi et al. | 96/115 |
| 4,252,921 | 2/1981 | Merrill et al. | 525/437 |
| 4,609,606 | 9/1986 | Noonan et al. | 430/69 |
| 4,965,017 | 10/1990 | Holmes et al. | 359/75 |
| 4,965,242 | 10/1990 | DeBoer et al. | 503/227 |

Primary Examiner—Alexander S. Thomas
Attorney, Agent, or Firm—Harold E. Cole

[57] ABSTRACT

A liquid crystal display element comprising:
1) a pair of substrates including a first transparent substrate having thereon a transparent electrode and a polymeric alignment layer, and a second transparent substrate having thereon a transparent electrode and a polymeric alignment layer;
2) a ferroelectric liquid crystal material disposed between the pair of substrates; and
3) at least one of the first or second substrates further comprising a color filter array;

and wherein the polymeric alignment layer is a crosslinked polyester which is derived from 1,4-phenylene bis(2-acrylic acid) and at least one aliphatic glycol that does not contain any aromatic dibasic acid component.

5 Claims, No Drawings

PHOTOSENSITIVE CROSSLINKABLE POLYESTER ALIGNMENT LAYERS FOR LIQUID CRYSTAL DISPLAYS

This invention relates to a photosensitive crosslinkable polyester alignment layer used for liquid crystal display devices.

In recent years, thermal transfer systems have been developed to obtain prints from pictures which have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor element is placed face-to-face with a dye-receiving element. The two are then inserted between a thermal printing head and a platen roller. A line-type thermal printing head is used to apply heat from the back of the dye-donor sheet. The thermal printing head has many heating elements and is heated up sequentially in response to the cyan, magenta and yellow signals. The process is then repeated for the other two colors. A color hard copy is thus obtained which corresponds to the original picture viewed on a screen. Further details of this process and an apparatus for carrying it out are contained in U.S. Pat. No 4,621,271.

Liquid crystal display devices are known for digital display in electronic calculators, clocks, household appliances, audio equipment, etc. Liquid crystal displays are being developed to replace cathode ray tube technology for display terminals. Liquid crystal displays occupy a smaller volume than cathode ray tube devices with the same screen area. In addition, liquid crystal display devices usually have lower power requirements than corresponding cathode ray tube devices.

There has been a need to incorporate a color display capability into such monochrome display devices, particularly in such applications as peripheral terminals using various kinds of equipment involving phototube display, mounted electronic display, or TV-image display. Various attempts have been made to incorporate a color display using a color filter array element into these devices. However, none of the color array elements for liquid crystal display devices so far proposed have been successful in meeting all the users' needs.

One commercially-available type of color filter array element which has been used in liquid crystal display devices for color display capability is a transparent support having a gelatin layer thereon which contains dyes having the additive primary colors red, green and blue in a mosaic pattern obtained by using a photolithographic technique. To prepare such a color filter array element, a gelatin layer is sensitized, exposed to a mask for one of the colors of the mosaic pattern, developed to harden the gelatin in the exposed areas, and washed to remove the unexposed (uncrosslinked) gelatin, thus producing a pattern of gelatin which is then dyed with dye of the desired color. The element is then recoated and the above steps are repeated to obtain the other two colors. Misalignment or improper deposition of color materials may occur during any of these operations. This method therefore contains many labor-intensive steps, requires careful alignment, is time-consuming and very costly. Further details of this process are disclosed in U.S. Pat. No. 4,081,277. U.S. Pat. No. 4,786,148 also discloses a color filter array element which employs certain pigments.

Color liquid crystal display devices generally include two spaced glass panels which define a sealed cavity which is filled with a liquid crystal material. For actively-driven devices, a transparent electrode is formed on one of the glass panels, which electrode may be patterned or not, while individually addressable electrodes are formed on the other of the glass panels. Each of the individual electrodes has a surface area corresponding to the area of one picture element or pixel. If the device is to have color capability, a color filter array with, e.g., red, green and blue color areas must be aligned with each pixel. Depending upon the image to be displayed, one or more of the pixel electrodes is energized during display operation to allow full light, no light or partial light to be transmitted through the color filter areas associated with that pixel. The image perceived by a user is a blending of colors formed by the transmission of light through adjacent color filter areas.

In forming such a liquid crystal display device, the color filter array element to be used therein may have to undergo rather severe heating and treatment steps during manufacture. For example, a transparent conducting layer, such as indium tin oxide (ITO), is usually vacuum sputtered onto the color filter array element which is then cured and patterned by etching. The curing may take place at temperatures elevated as high as 200° C. for times which may be as long as one hour or more. This is followed by coating with a thin polymeric alignment layer for the liquid crystals, such as a polyimide, followed by another curing step for up to several hours at an elevated temperature. These treatment steps can be very harmful to many color filter array elements, especially those with a gelatin matrix.

In U.S. Pat. No. 4,965,242, there is described a process of preparing a color filter array element for use in making a color liquid crystal display device comprising:
  a) overlaying a dye-receiving element with a dye-donor element, the dye-receiving element comprising a dimensionally-stable temporary support having thereon, in order, a polymeric alignment layer, a transparent conducting layer and a dye-receiving layer;
  b) imagewise heating the dye-donor element to transfer a dye image in a repeating mosaic pattern to the dye-receiving layer;
  c) removing the dye-donor element from contact with the dye-receiving element;
  d) laminating a transparent permanent support to the dye-receiving layer containing the dye image in a repeating mosaic pattern; and
  e) removing the temporary support to expose one surface of the polymeric alignment layer, thereby forming the color filter array element.

Although a wide-variety of materials may appear at first to be suitable for an alignment layer, in the production method cited for liquid crystal display, several other criteria are important. Not only must the material function as an alignment layer, but it must release from the intermediate support and must be unaffected by chlorinated solvents such as would be used to coat the dye-receiving element used to form the color filter array. It is also highly desirable that the polymer crosslink in a short time.

It is an object of this invention to provide a polymeric alignment layer which is capable of releasing from an intermediate support and be uneffected by chlorinated solvents such as would be used to coat a dye-receiving element to form a color filter array.

These and other objects are achieved in accordance with this invention which comprises a liquid crystal display element comprising:
1) a pair of substrates including a first transparent substrate having thereon a transparent electrode and a polymeric alignment layer, and a second transparent substrate having thereon a transparent electrode and a polymeric alignment layer;
2) a ferroelectric liquid crystal material disposed between the pair of substrates; and
3) at least one of the first or second substrates further comprising a color filter array;

and wherein the polymeric alignment layer is a cross-linked polyester which is derived from 1,4-phenylene bis(2-acrylic acid) and at least one aliphatic glycol that does not contain any aromatic dibasic acid component.

In a preferred embodiment of the invention, the polyester is derived from an aliphatic diol which is HO—$C_5H_{10}$—OH. In another preferred embodiment of the invention, the polyester is derived from an aliphatic diol having the formula HO—R—H wherein R is:

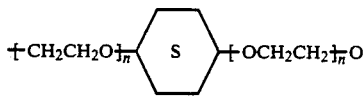

wherein n in an integer of from 1 to 4.

The polyhydric alcohols of the polyester glycol component capable of condensing with a carboxylic acid or functional derivative thereof are diols of the formula HO—R'—OH wherein R' is a divalent organic radical generally having from about 2 to about 40 carbon atoms and including hydrogen and carbon atoms, and optionally, ether oxygen atoms. Exemplary preferred R' radicals include hydrocarbon radicals, such as straight and branched chain alkylene radicals (e.g., ethylene, trimethylene, neopentylene, etc.), cycloalkylene radicals (e.g., cyclohexylene, cycloheptylene, etc.), and arylene radicals (e.g., phenylene); and hydrocarbon-oxyhydrocarbon radicals, such as alkylene-oxy-alkylene, alkylene-oxycycloalkylene-oxyalkylene, and the like. Exemplary diols that can be utilized in preparing the condensation polyesters useful in this invention include ethylene glycol, diethylene glycol, 1,3-propanediol, 1,4-butanediol, 1,5-pentanediol, 1,6-hexanediol, 1,7-heptanediol, 1,8-octanediol, neopentyl glycol, 2,2-diethyltrimethylene glycol, 1,3-cyclohexane dimethanol, 1,4-cyclohexane dimethanol, triethylene glycol, tetraethylene glycol, 2,3-norboranediol, 2,5(6)-norboranediol and the like.

The polyesters of the invention are not novel and are described in U.S. Pat. Nos. 3,929,489, 4,609,606, and 4,252,921, the disclosures of which are hereby incorporated by reference. The polyesters are photosensitive and may be crosslinked by exposure to uv light in accordance with well-known techniques.

Liquid crystal display devices are commonly made by placing a material, which is liquid crystalline at the operating temperature of the device, between two transparent electrodes, usually indium tin oxide coated on a substrate such as glass, and exciting the device by applying a voltage across the electrodes. Alignment layers are provided over the transparent electrode layers on both substrates and are treated to orient the liquid crystal molecules in order to introduce a twist of, e.g., 90°, between the substrates. Thus, the plane of polarization of plane polarized light will be rotated in a 90° angle as it passes through the twisted liquid crystal composition from one surface of the cell to the other surface. Application of an electric field between the selected electrodes of the cell causes the twist of the liquid crystal composition to be temporarily removed in the portion of the cell between the selected electrodes. By use of optical polarizers on each side of the cell, polarized light can be passed through the cell or extinguished, depending on whether or not an electric field is applied.

The transparent conducting layer described above is also conventional in the liquid crystal art. Such materials include indium tin oxide, indium oxide, tin oxide, cadmium stannate, etc.

The dye image-receiving layer used in forming the color filter array element used in the invention may comprise, for example those polymers described in U.S. Pat. Nos. 4,695,286, 4,740,797, 4,775,657 and 4,962,081, the disclosures of which are hereby incorporated by reference. In a preferred embodiment, polycarbonates having a glass transition temperature greater than about 200° C. are employed. In another preferred embodiment, polycarbonates derived from a methylene substituted bisphenol-A are employed such as 4,4'-(hexahydro-4,7-methanoindan-5-ylidene)-bisphenol. In general, good results have been obtained at a coverage of from about 0.25 to about 5 mg/m$^2$.

The support used in the invention is preferably glass such as borax glass, borosilicate glass, chromium glass, crown glass, flint glass, lime glass, potash glass, silica-flint glass, soda glass, and zinc-crown glass. In a preferred embodiment, borosilicate glass is employed.

A dye-donor element that is used to form the color filter array element used in the invention comprises a support having thereon a dye layer. Any dye or mixture of dyes can be used in such a layer provided they are transferable to the dye imagereceiving layer of the color array element of the invention by the action of heat. Especially good results have been obtained with sublimable dyes. Examples of sublimable dyes include anthraquinone dyes, e.g., Sumikalon Violet RS ® (Sumitomo Chemical Co., Ltd.), Dianix Fast Violte 3R-FS ® (Mitsubishi Chemical Industries, Ltd.), and Kayalon Polyol Brilliant Blue N-BGM ® and KST Black 146 ® (Nippon Kayaku Co., Ltd.); azo dyes such as Kayalon Polyol Brilliant Blue BM ®, Kayalon Polyol Dark Blue 2BM ®, and KST Black KR ® (Nippon Kayaku Co., Ltd.), Sumickaron Diazo Black 5G ® (Sumitomo Chemical Co., Ltd.), and Miktazol Black 5GH ® (Mitsui Toatsu Chemicals, Inc.); direct dyes such as Direct Dark Green B ® (Mitsubishi Chemical Industries, Ltd.) and Direct Brown M ® and Direct Fast Black D ® (Nippon Kayaku Co. Ltd.); acid dyes such as Kayanol Milling Cyanine 5R ® (Nippon Kayaku Co. Ltd.); basic dyes such as Sumicacryl Blue 6G ® (Sumitomo Chemical Co., Ltd.), and Aizen Malachite Green ® (Hodogaya Chemical Co., Ltd.);

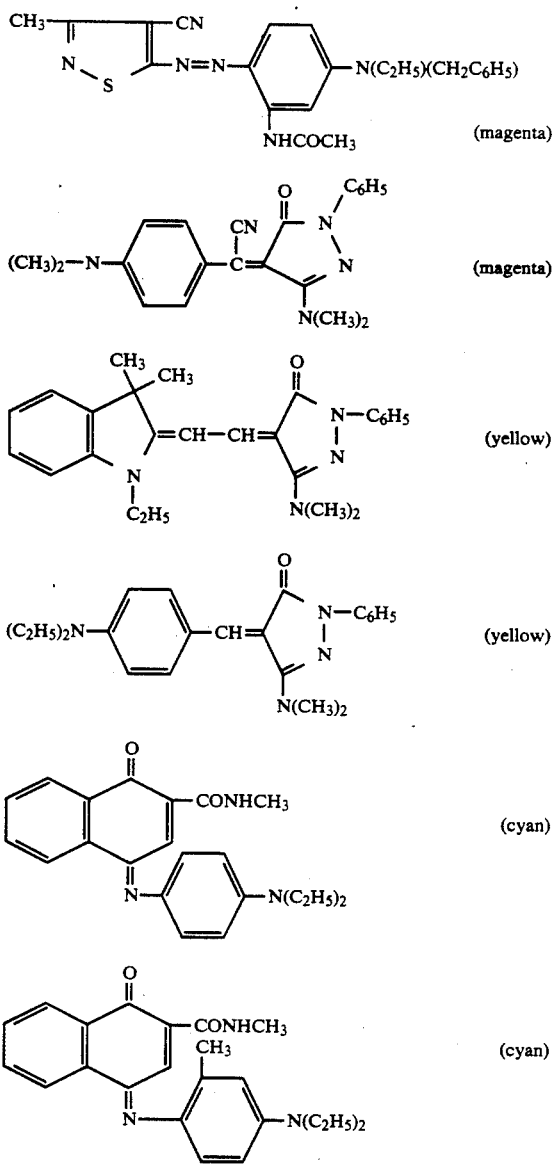

or any of the dyes disclosed in U.S. Pat. Nos. 4,541,830, 4,541,830, 4,698,651, 4,695,287; 4,701,439, 4,757,046, 4,743,582, 4,769,360 and 4,753,922, the disclosures of which are hereby incorporated by reference. The above subtractive dyes may be employed in various combinations to obtain the desired red, blue and green additive primary colors. The dyes may be mixed within the dye layer or transferred sequentially if coated in separate dye layers. The dyes may be used at a coverage of from about 0.05 to about 1 g/m².

Various methods may be used to transfer dye from the dye donor to the transparent support to form the color filter array element used in the invention. There may be used, for example, a high intensity light flash technique with a dye-donor containing an energy absorptive material such as carbon black or a light-absorbing dye. Such a donor may be used in conjunction with a mirror which has a grid pattern formed by etching with a photoresist material. This method is described more fully in U.S. Pat. No. 4,923,860.

Another method of transferring dye from the dye donor to the transparent support to form the color filter array element of the invention is to use a heated embossed roller as described more fully in U.S. application Ser. No. 408,580 by Simons entitled "Method of Making a Color Filter Array Using a Heated Embossed Surface", filed Sep. 18, 1989.

In another embodiment of the invention, the imagewise-heating is done by means of a laser using a dye-donor element comprising a support having thereon a dye layer and an absorbing material for the laser, the imagewise-heating being done in such a way as to produce a repeating mosaic pattern of colorants.

Any material that absorbs the laser energy or high intensity light flash described above may be used as the absorbing material such as carbon black or nonvolatile infrared-absorbing dyes or pigments which are well known to those skilled in the art. In a preferred embodiment, cyanine infrared absorbing dyes are employed as described in U.S. Pat. No. 4,973,572, or other materials as described in the following U.S. Pat. Nos. 4,948,777, 4,950,640, 4,950,639, 4,948,776, 4,948,778, 4,942,141, 4,952,552 and 4,912,083 and U.S. application Ser. Nos.: 366,952, 369,492, and 369,491, the disclosures of which are hereby incorporated by reference. The laser radiation is then absorbed into the dye layer and converted to heat by a molecular process known as internal conversion. Thus, the construction of a useful dye layer will depend not only on the hue, transferability and intensity of the image dyes, but also on the ability of the dye layer to absorb the radiation and convert it to heat. The infrared-absorbing material may be contained in the dye layer itself or in a separate layer associated therewith.

The following examples are provided to illustrate the invention.

EXAMPLE 1

On an unsubbed 75 μm thick Kapton ® support (a polymer of the diimide of pyromellitic acid and 4,4'-oxydianiline) (duPont Co.) a layer of each of the photosensitive polymers of the invention, comparison photosensitive polymers, or control photonon-sensitive polymers was coated at 1.2 g/m². The polyesters also contained Sensitizer KC74 (a biscoumarin ketone) (Eastman Kodak Co.) (0.036 g/m²) of the structure indicated below.

The following polymers were coated as alignment layers for a liquid crystal display cell:

A1 Invention photocrosslinkable polyester considered derived from 1,4-phenylene bis(2-acrylic acid) and 1,5-pentane diol) (coated from methylene chloride).

A2 Invention photocrosslinkable polyester considered derived from 1,4-phenylenebis(2-acrylic acid), adipic acid, and 1,4-bis(2-hydroxyethoxy) cyclohexane (acrylate: adipate ratio, 7:3) (coated from dimethyl formamide).

A3 Invention photocrosslinkable polyester considered derived from 1,4-phenylene bis(2-acrylic acid), adipic acid, and 1,5-pentanediol (acrylate:adipate ratio,7:3) (coated from 1,1,2,2-tetrachloroethane).

C1 Comparison photocrosslinkable polyester derived from 1,4-phenylene bis (2-acrylic acid), isophthalic acid, and 1,4-bis (2-hydroxyethoxy) cyclohexane (acrylate: phthalate ratio, 1:1) (coated from dimethyl formamide).

C2 Comparison photocrosslinkable polyester derived from 1,4-phenylene bis(2-acrylic acid), isophthalic acid, and 1,5-pentanediol (acrylate: phthalate ratio, 1:1) (coated from 1,1,2,2-tetrachloroethane).

C3 Control of a commercial photocrosslinkable polyimide Probimide 412 (Ciba-Geigy Co) described as a photoimageable preimidized polymer that may be related to the diimide of 3,3'4,4'-benzophenone terecarboxylic acid and a dialkyl-p-phenylenediamine (the polymeric diimide as supplied by the manufacturer is in a gamma-butyrolactone solvent which is not suitable for coating because of its high boiling point. Thus, the polymer was precipitated from methanol, isolated by filtration, dried, and redissolved in methylene chloride for coating).

C4 Control of a commercial non-photocrosslinkable polyimide: Ultem 1000 ® (General Electric) of the following structure coated from methylene chloride:

C5 Control of a Commercial non-photocrosslinkable polyimide: Matrimide 528 ® (Ciba-Geigy) of the following structure coated form methylene chloride.

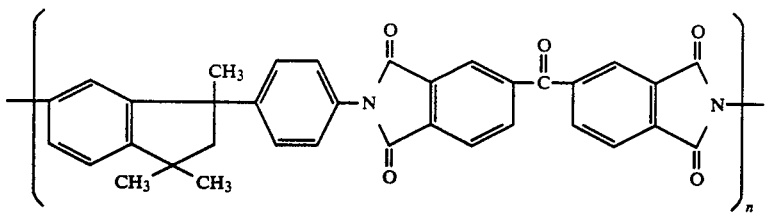

C6: Control of a commercial non photocrosslinkable polyimide: Sixef 33 ® (Hoechst-Celanese) of the following structure coated from methylene chloride:

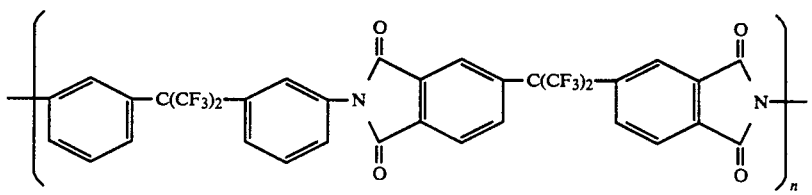

C7: Control of a commercial non-photocross-linkable polyimide: Sixef 44 ® (Hoechst-Celanese) of the following structure coated from dimethylformamide:

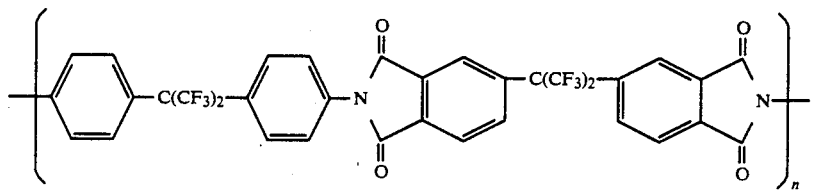

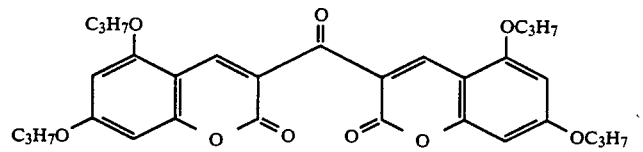

Sensitizer KC74

Each coated photocrosslinkable polymeric alignment layer was exposed under vacuum to ultraviolet light for 60 sec (160 mJ/cm$^2$) using a Co-Light Co. M-218 200 watt medium pressure mercury vapor exposure unit. This produced a cross-linked alignment layer on a flexible support 20 cm in width from which a uniform small area was selected for further testing. Control C-3 which used a photocross-linkable polymer of lesser sensitivity required an exposure of more than 180 sec (>475

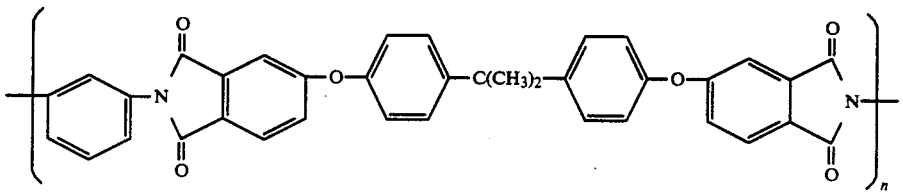

mJ/cm²). Controls C-4, C-5, C-6, C-7 which used a non-photocrosslinkable polymer were not exposed as described above.

On top of the cross-linked polymeric alignment layer, a transparent indium-tin oxide (90:10 ratio) conducting layer was prepared using a known technique of reactive sputtering of a metal target. A Leybold Heraeus GmbH device equipped with a HRC373 cathode was used to sputter Pure Tech. Inc. indium metal doped with 10 percent tin at ambient temperature, and an auxiliary discharge copper electrode placed in the reactive discharge region was used to improve the uniformity of the deposition. After evacuation of the chamber to about 10−6 Torr, and charging with 18% oxygen in argon to 0.008 Torr, the plasma was started (at 530 watts), and the substrate (the polymeric alignment layer on the flexible support) was phased at a distance of 7.6 cm from the target on a roller device. This produced an indium tin-oxide conducting layer about 0.1 micrometers thick of <500 ohms/square. The conducting layer was extended beyond the alignment layer to provide a means for electrical contact.

On top of the conducting layer a subbing layer of poly(acrylonitrile-co-vinylidene chloride-coacrylic acid) (14:79:7 wt ratio) (0.11 g/m²) was coated from butanone.

On top of the subbed-conducting layer, a dye-receiving layer of the following polycarbonate derived from 4,4'-hexahydro-4,7-methanoindan-5-ylidene)bisphenol (Tg=260° C.) (2.9 g/m²) was coated from a methylene chloride and 1,1,2 trichloroethylene solvent mixture:

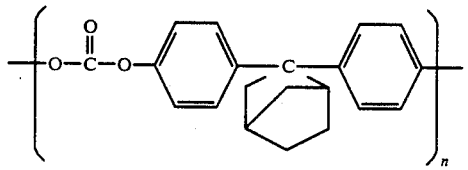

mw = 100,00
n = 250

Composites involving invention polymers A2 and A3 and comparison polymers C1 and C2 did not contain the subbing layer and dye receiving layer.

When the receiving layer was coated on composites C4, C5, C6, and C7, the alignment layer dissolved indicating that the methylene chloride solvent penetrated through the subbing and conducting layers. Because of this solubilization of the alignment layer, no further work was possible.

A test area of green dye was transferred to the above receiving layer of the composite using a mixed yellow and cyan dye-donor using a high-intensity light flash.

The dye-donor used for these transfer experiments was prepared by coating on an unsubbed 175 μm clear poly(ethylene terephthalate) support a layer of a mixture of the cyan dye (0.30 g/m²) illustrated below and the first yellow dye (0.27 g/m²), illustrated above, Raven Black ® 1255 carbon (Columbia Carbon) (0.40 g/m²) ballmilled to submicron particle size, FC-431 ® (dispersant) (3M Corp) (0.01 g/m²) and Solsperse 24000 ® (dispersant) (ICI Corp) in a cellulose acetate propionate binder (2.5% acetyl, 46% propionyl) (0.40 g/m²) coated from a 1-propanol, 2-butanone, toluene and cyclopentanone solvent mixture.

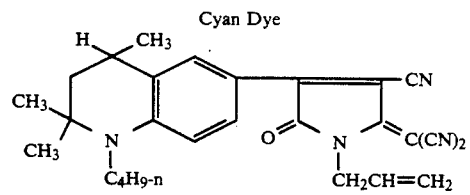

Cyan Dye

The dye-donor was placed face down upon the composite dye-receiver. A Mecablitz ® 402 electronic flash unit (Metz AG Co.) (used as a thermal energy source) was placed 40 mm above the dye-donor using a 45-degree mirror box to concentrate the energy from the flash unit within a 25×50 mm area; the dye transfer area was masked to 12×42 mm. The flash unit was flashed once to produce a transferred transmission density at least 0.5 at the maximum absorption of the dye mixture. The dye-receiving composite was separated from the dye-donor element and placed in a sealed chamber saturated with dichloromethane vapors for 5 minutes at 20° C. to stabilize the image.

The dye-receiving side of the composite was laminated to a 2.5 cm×7.5 cm piece of 1 mm thick borosilicate glass using a Kodabond ® 5116 hot melt adhesive sheet (Eastman Kodak Co.) (25 μm thick) by passing through a Kodak Readyprint Photo Laminator ® (Eastman Kodak Co.) 176° C. as described in U.S. Pat. No. 4,933,266.

The flexible support was then peeled off exposing the alignment layer side of the composite with the test dye area. The composites with the comparison polyesters C1 and C2 could not be peeled from the flexible support, thus no further testing was done.

A means for electrical contact to the conducting layer was provided by melting an indium metal bridge across the glass and that position of the conducting layer that extended beyond the alignment layer. This composite represented one-side (test dye side) of a liquid crystal display device.

For the second side of the liquid crystal display device the same composite was prepared as described above but no subbing layer, or receiving layer were used (the second side of the liquid crystal display consisted only of the alignment layer and conducting layer).

Each alignment layer side was repeatedly rubbed firmly with a polyester cloth in a controlled direction so that the alignment layer "grooves" would be mutually perpendicular upon assembly of the cell.

A sheet of NPF-G122-DU polarizer and adhesive layer (Nitto Electric Ind. KK) cut to the size of the glass composite was attached to the back (glass) side of each composite so when the two halves were assembled to form the cell, both the polarizer and alignment layer would be mutually perpendicular to each other on each half (the polarizers crossed so the cell did not transmit light).

The area of the liquid crystal cell was created by placing the two composites together with glass support outward using a spacer of poly(ethylene terephthalate) 12 um thick having a circular-center opening about 1 cm diameter. The spacer thickness of 12 um defined the electrode spacing distance between the two composites.

The composite with the polyester spacer was positioned, and a small drop (approximately 0.05 mL) of Licrystal LZI-1289 TN (EM Industries) was placed within the spacer. The edge of the other composite was laid on the spacer, wetted with liquid crystal by contacting the small drop of liquid crystal, lowered onto the spacer, and excess liquid crystal was expelled by exerting light pressure. The assemblage was placed in a holder, and clamped together.

The cell was tested by applying a 20 Hz sine wave carried on a 4 Hz square wave with steadily increasing voltage through the contact leads. The lowest voltage at which the onset of cell blinking was visible was recorded as the threshold voltage.

| Alignment Layer Polymer | Threshold Voltage (v) | Notes |
|---|---|---|
| A1 | 2.7 | Cell produced switched efficiently |
| A2 | 3.5 | Cell produced switched efficiently |
| A3 | 4.0 | Cell produced switched efficiently |
| C1 | nd | Could not peel alignment layer from support |
| C2 | nd | Could not peel alignment layer from support |
| C3 | 2.8 | Required higher exposure for insolubilization |
| C4 | nd | Alignment layer soluble in dichloromethane |
| C5 | nd | Alignment layer soluble in dichloromethane |
| C6 | nd | Alignment layer soluble in dichloromethane |
| C7 | nd | Alignment layer soluble in dichloromethane |

The data above show that photocrosslinkable polyesters derived from 1,4-phenylene bis(2-acrylic acid) with or without an optional aliphatic dibasic acid are effective as an alignment layer for a liquid crystal display and have high resistance to attack by chlorinated solvents. Comparison photocrosslinkable polyesters with an aromatic dibasic acid component, C1 and C2, could not be evaluated as alignment layers because the composite could not be peeled from the flexible support. A state of the art alignment layer derived from a photocrosslinkable polyimide gave good results in providing a liquid crystal display, however, did require substantially more exposure as will be shown in Example 2. Alignment layers of the non-photocrosslinkable polyimides were too soluble in chlorinated solvents to permit coating a receiver layer to permit formation of a patterned color filter array as described in U.S. Pat. No. 4,965,242.

EXAMPLE 2

This example provides further data for the photosensitive invention and control polymers described in Example 1 as being suitable for forming alignment layers for liquid crystal displays. The polyimide Probimide 412 (Ciba-Geigy Co.) was described in U.S. Pat. No. 4,965,242 as an alignment layer. Although a useful liquid crystal display was created, the time of exposure required to provide adequate crosslinking resistance to dissolution in methylene chloride was too long.

A test was devised to evaluate resistance to attack by methylene chloride (and presumably other chlorinated solvents useful for coating a dye-receiving layer). The invention polyester A1 was dissolved in methylene chloride and coated on a 75 μm thick Kapton ® support (duPont Co.) at a coverage of 1.2-1.3 g/m². The control polyimide C3 was coated on a 75 μm thick Kapton ® support from methylene chloride at a coverage of 1.2-1.3 g/m².

Each coating was exposed under vacuum in a Co-Light Co. M-218 to ultra violet light for a controlled time interval. At 160 mJ/cm² (60 sec) the coating with the invention polyester remained intact when overcoated with a polycarbonate receiving layer using methylene chloride as described in Example 1. The control polyimide coating, however, after being exposed for the same length of time (energy of exposure), softened and cracked when overcoated with a polyester receiver using methylene chloride as the coating solvent. Both the invention and control coatings were not attacked by methylene chloride when exposed for 480 mJ/cm² (approximately 180 sec).

In a separate test, each coated alignment layer was immersed with agitation for 3 minutes in methylene chloride. Only 320 mJ/cm² exposure were required to insolubilize the polyesters of the invention that the layer remained intact, whereas 800 mJ/cm² were required to insolubilize the polyimide. This shows the invention polyester undergoes crosslinking at a considerably shorter time. Approximately three time the exposure is required to crosslink the polyimide.

Separate experiments have also shown that the invention polyesters may be coated thinner than the polyimide, 1.0 g/m² is believed effective to provide resistance to the methylene chloride test. The invention polyesters also do not need to be crosslinked under vacuum as they are unaffected by the presence of oxygen during the crosslinking reaction whereas the presence of oxygen slows down the rate of crosslinking of the polyimide.

The invention has been described in detail with particular reference to preferred embodiments thereof, but it will be understood that variations and modifications can be effected within the spirit and scope of the invention.

What is claimed is:

1. In a liquid crystal display element comprising:
   1) a pair of substrates including a first transparent substrate having thereon a transparent electrode and a polymeric alignment layer, and a second transparent substrate having thereon a transparent electrode and a polymeric alignment layer;
   2) a ferroelectric liquid crystal material disposed between said pair of substrates; and
   3) at least one of said first or second substrates further comprising a color filter array;
   the improvement wherein each said polymeric alignment layer is a crosslinked polyester which is derived from 1,4-phenylene bis(2-acrylic acid) and at least one aliphatic glycol that does not contain any aromatic dibasic acid component.

2. The element of claim 1 wherein said transparent conducting layer is indium tin oxide.

3. The element of claim 1 wherein said polyester is derived from an aliphatic diol which is HO—C₅H₁₀—OH.

4. The element of claim 1 wherein said polyester is derived from an aliphatic diol having the formula HO—R—H wherein R is:

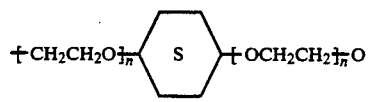

wherein n in an integer of from 1 to 4.

5. The element of claim 1 wherein said transparent substrates are glass.

* * * * *